United States Patent [19]

Konrad

[11] Patent Number: 5,473,578

[45] Date of Patent: Dec. 5, 1995

[54] SONAR AND CALIBRATION UTILIZING NON-LINEAR ACOUSTIC RERADIATION

[75] Inventor: William L. Konrad, Niantic, Conn.

[73] Assignee: The United States of America as represented by the Secretary of the Navy, Washington, D.C.

[21] Appl. No.: 209,285

[22] Filed: Mar. 14, 1994

[51] Int. Cl.⁶ .................................................. H04B 13/00
[52] U.S. Cl. .......................................... 367/13; 73/1 DV
[58] Field of Search .................................. 367/13, 92, 87, 367/907, 124; 424/6, 7; 73/1 DV

[56] References Cited

U.S. PATENT DOCUMENTS

| | | | |
|---|---|---|---|
| 2,411,537 | 11/1946 | Goodale, Jr. | 367/13 |
| 3,882,444 | 5/1975 | Robertson | 367/92 |
| 3,896,411 | 7/1975 | Mackey et al. | 367/98 |
| 3,909,772 | 9/1975 | Miller, III et al. | 367/87 |
| 3,936,958 | 2/1976 | Clapsaddle | 434/6 |
| 4,135,142 | 1/1979 | Percy et al. | 367/92 |
| 4,213,195 | 7/1980 | Pridham | 367/92 |
| 4,445,361 | 5/1984 | Moffett et al. | 73/1 DV |
| 4,603,408 | 7/1986 | Singhal et al. | 367/92 |

*Primary Examiner*—Ian J. Lobo
*Attorney, Agent, or Firm*—Michael J. McGowan; James Kasischke; Prithvi C. Lall

[57] ABSTRACT

An acoustic beam having at least one preset frequency is generated and directed towards a preselected non-linear acoustic reradiator. The reradiator returns acoustic waves having a different frequency. These reradiated waves are monitored, and a preselected parameter is detected in response to the returned reradiated acoustic waves. In a first embodiment, the preset frequency acoustic beam is generated at one or more frequencies and radiated by at least one projector. Upon incidence of the preset frequency acoustic beam, a preselected reradiator generates acoustic waves having a different frequency. The reradiated acoustic waves are used to calibrate a hydrophone. The reradiated acoustic waves can be controlled by the acoustic projector without a wire link.

In another embodiment, the non-linear reradiation is caused by the action of a projected beam on cavitation generated by a vessel remote from the projector. The action of the acoustic beam upon cavitation at the propeller or other structure generates acoustic waves having a different frequency. Undesirable reverberation is largely avoided since the receiver is adjusted to receive only the new frequencies generated by the cavitation.

11 Claims, 2 Drawing Sheets

SONAR AND CALIBRATION UTILIZING NON-LINEAR ACOUSTIC RERADIATION

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

1. Field of the Invention

This invention is directed to the field of acoustic detection, and more particularly, to a novel method of and apparatus for calibrating hydrophones and detecting vessels acoustically.

2. Description of the Prior Art

Vessels are presently detected using active sonar where a sonic pulse of given frequency or frequencies is reflected off the vessel and returns to the sonar system at essentially the same frequency or frequencies. In many instances, the performance of such sonar systems is limited by interfering reflections from the sea surface and bottom or from inhomogeneities in the water by the mechanism known as volume reverberation.

Conventional acoustic or sonar receiver calibration methods typically use an acoustic projector powered by a local source delivering power to the projector at the desired amplitude and frequency. A hydrophone to be calibrated is positioned at a receiving station away from the projector, It is usually desirable for the receiving station to control the amplitude and frequency of the projected sound. This is typically accomplished by either a wire link connecting the receiving station with the projector or by a voice link to an operator at the projector site.

SUMMARY OF THE INVENTION

Accordingly, it is a general purpose and object of the present invention to provide an apparatus and method for calibrating hydrophones used in sonar systems.

It is a further object that such apparatus and method be conducted without an intermediary to allow calibration of these hydrophones without communication to a third party.

Another general purpose and object of the present invention is to provide an apparatus and method for detecting vessels acoustically relatively free from noise generated by reverberation.

These objects are accomplished with the present invention by generating at least one acoustic energy beam having at least one preset frequency and directing this acoustic beam towards a preselected non-linear target or acoustic reradiator. The reradiator returns acoustic waves having a different frequency. These reradiated waves are monitored, and a preselected parameter is detected in response to the reradiated acoustic waves. In a first embodiment, the preset frequency acoustic beam is generated at one or more frequencies and radiated by at least one projector. The preselected acoustic reradiator is used as a non-linear reflector and is positioned at a known location with respect to the at least one acoustic projector. Upon incidence of the preset frequency acoustic beam, the preselected reradiator generates acoustic waves having a different frequency. At a region remote from the reradiator, the frequency and amplitude of the reradiated waves are received by at least one hydrophone to be calibrated. The frequency and amplitude of the reradiated waves can be controlled by the acoustic projector without a wire link by varying the preset frequency acoustic beam.

In another embodiment, the preselected non-linear reradiator is cavitation at a propeller remote from the projector or projectors. The action of the preset frequency acoustic beam upon the cavitation generates acoustic waves having a different frequency. These waves are monitored in a region remote from the reradiator, and the preselected parameter is the new frequency or frequencies generated at the reradiator. Undesirable reverberation is largely avoided since the receiver is adjusted to receive only these new frequencies generated by the action of the projected acoustic beam on cavitation caused by the vessel's propeller or on other non-linearities generated by the vessel.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
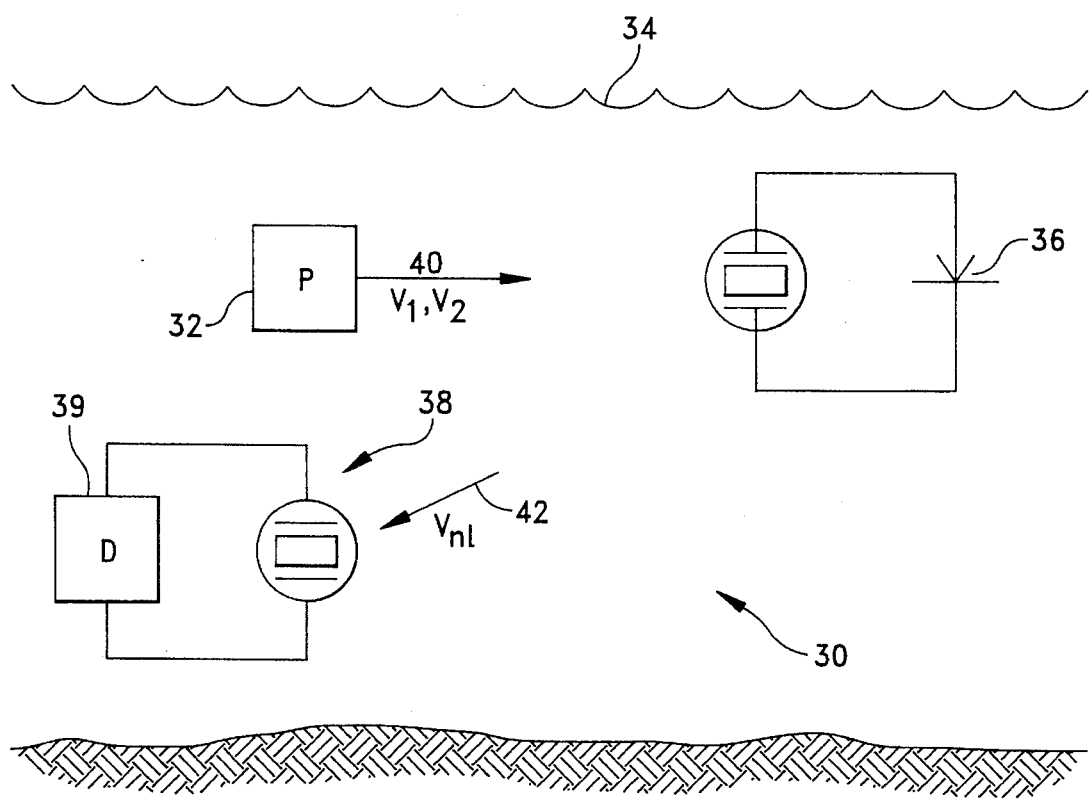
FIG. 1 is a schematic diagram illustrating a first embodiment of the method and apparatus exploiting acoustic non-linearity to calibrate a hydrophone in accord with the present invention.

Referring now to FIG. 1, generally designated at 30 is a first embodiment of the method and apparatus exploiting acoustic non-linearity to calibrate hydrophones in accord with the present invention. An acoustic projector 32 and a non-linear acoustic reradiator 36 are positioned in a spaced apart relation in an aqueous environment 34. A hydrophone or hydrophone array 38 to be calibrated joined to a detector 39 is positioned in the aqueous environment 34 to receive sounds from non-linear reradiator 36.

Acoustic projector 32 is driven by a frequency source, not shown, to provide at least one predetermined frequency acoustic energy beam. Projector 32 can be actuated to produce acoustic energy beams at one or more primary frequencies, and, in the illustrated embodiment, one such beam 40 having multiple frequencies is schematically identified by arrows marked "$v_1$" and "$v_2$" where $v_1$ and $v_2$ represent the multiple frequencies. Beam 40 traverses aqueous environment 34 and is incident to the non-linear reradiator 36. Reradiator 36 can be, for example, a transducer with a diode in parallel therewith, although, as will be appreciated, any suitable non-linear reradiator can be employed.

Figure 2:
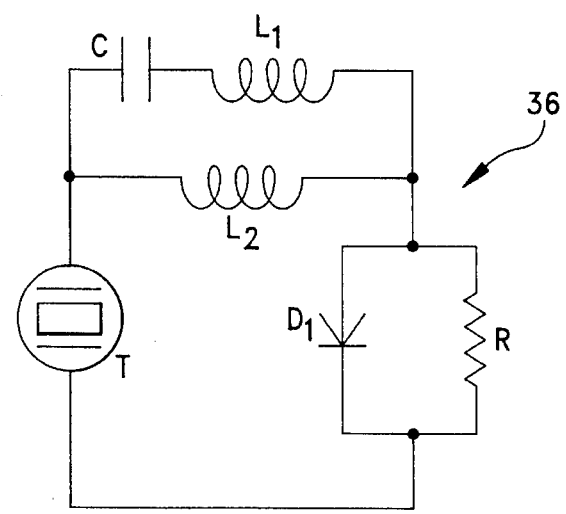
FIG. 2 is a schematic diagram of an acoustic reradiator useful in the first embodiment of the invention.

A particularly advantageous reradiator 36 for use with a multiple frequency beam generating an intermodulation product is illustrated in FIG. 2. Reradiator 36 includes a capacitor C and an inductor $L_1$ in series, together in parallel with an inductor $L_2$, which form a series resonant circuit at the mean primary frequency of the projector 32 (FIG. 1), thereby coupling maximum energy at the primary frequencies to a non-linear element $D_1$, in parallel with resistive element R, together in series therewith. Non-linear element $D_1$ can be any non-linear circuit element such as a diode. Inductor $L_2$ acts with the inherent capacitance of transducer T to resonate at the difference or sum frequency thereby increasing the voltage across transducer T. The non-linear reradiator 36 thereby enables a relatively large voltage at, for example, the difference frequency of the projector 32 to be applied across a transducer T. The voltage at the difference frequency generated by non-linear element $D_1$ appears across the transducer T multiplied by the quality factor Q of the circuit. In practice, this Q can be as high as ten since the total transducer resistance below resonance is relatively low. With non-linear reradiator 36, as will be appreciated, a high amplitude difference frequency output is achieved by which hydrophone array 38 can be calibrated.

Returning now to FIG. 1, beam 40 of one or more frequencies $v_1$, $v_2$ of acoustic energy traverses medium 34 and impacts non-linear reradiator 36. In the embodiment illustrated, non-linear element $D_1$ of FIG. 2 produces a reradiated acoustic energy beam 42 having a frequency $v_{n1}$ different from $v_1$ or $v_2$. In the case where beam 40 is a single frequency acoustic energy beam radiated by the projector 32, harmonics are generated in the transducer T or in the transducer T and diode $D_1$ combination of the non-linear reradiator 36. These harmonics, reradiated as reradiated waves 42, are received by hydrophone 38 and detected by detector 39, thereby enabling calibration of the system. Hydrophone calibration is accomplished by comparing the known non-linear reradiator output 42 with the frequency and amplitude of the beam detected by detector 39. The reradiated harmonics will typically have a greater frequency than that of the single frequency acoustic beam. In the case where at least two frequencies are radiated by projector 32 of frequencies $v_1$ and $v_2$, the projected acoustic beam 40 produces intermodulation products at non-linear reradiator 36 in addition to harmonics. Intermodulation products result from an interference pattern between the two emitted frequencies $v_1$ and $v_2$, and the resulting waves 42 can be either the difference frequency between the two frequencies or a harmonic of the difference frequency. The intermodulation products are radiated from reradiator 36 in form of reradiated waves 42, which are incident to the hydrophone 38 thereby enabling its calibration. In either case, the frequency and amplitude of the reradiated waves 42 are controlled remotely by changing the frequency and amplitude of beam 40 emitted by projector 32 without wires as in the heretofore known technique. Either the difference frequency or the sum frequency intermodulation product can be advantageously utilized.

In another embodiment, transducer T can be selected to be physically large compared to a wavelength $v_{n1}$ at the harmonic or difference frequency and therefore can reradiate a relatively narrow pattern of waves 42 in the direction of receiving hydrophone 38. The use of a directional transducer T at as part of non-linear reradiator 36 can substantially increase the source level, and, hence, the level of the sound received at hydrophone 38 to be calibrated.

Figure 3:
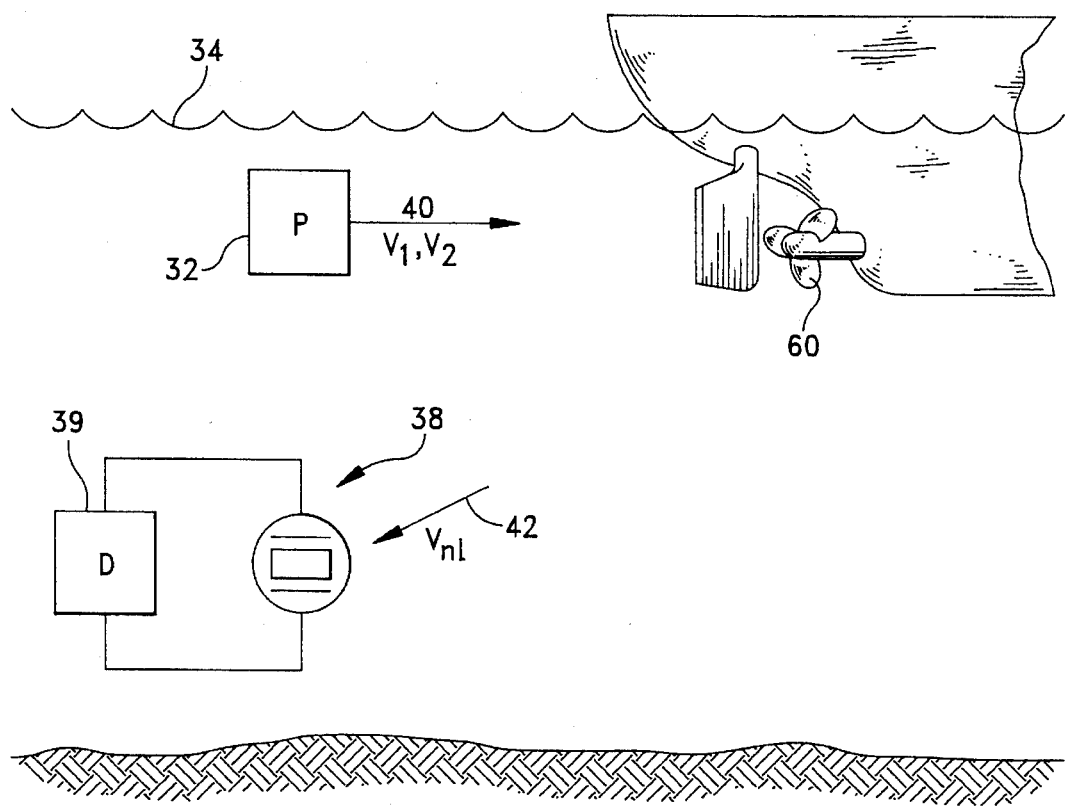
FIG. 3 is a schematic diagram illustrating an alternative embodiment of the method and apparatus wherein the acoustic reradiator is cavitation caused by a propeller.

In an alternative embodiment, as shown in FIG. 3, a non-linear reradiator, such as an area of cavitation created by a propeller 60, can serve as the passive element by reradiating the incident beam 40 as waves 42 back to hydrophone 38. In this embodiment, hydrophone 38 and detector 39 are not to be calibrated but rather are used detect reradiated waves 42 returned from the area of propeller 60 in a manner more free from reverberation effects than the heretofore known conventional sonar technique. Cavitation from propeller 60 creates a discontinuity in aqueous medium 34. When a sonar beam 40 enters this discontinuity or cavitation in the area surrounding the propeller, the frequency of beam 40 is changed, and acoustic waves 42 having a different frequency are returned to hydrophone 38 and detector 39. Thus cavitation caused by propeller 60 acts as a non-linear reradiator. The returning acoustic waves 42 are received at hydrophone 38 relatively free from the reverberation generated by the original beam 40.

In all of the above embodiments, the parameters of the acoustic sources are selected to minimize the generation of intermodulation products before entering the non-linear region of the medium so as to maximize the return signal to reverberation ratios from the desired target.

Many modifications of the presently disclosed invention will become apparent to those skilled in the art having benefitted by the instant disclosure.

What is claimed is:

1. An apparatus for determining parameters in an aqueous environment comprising:

an acoustic projector positioned in said aqueous environment for projecting an acoustic beam having at least one preset frequency;

a non-linear acoustic reradiator positioned in said aqueous environment to receive said acoustic beam and reradiate an acoustic wave having a different frequency than said preset frequency said non-linear acoustic reradiator is borne by a vessel to be detected in said aqueous environment, and said parameters to be detected are the intensity and frequency of said reradiated acoustic wave;

a hydrophone positioned in said aqueous environment to receive said reradiated acoustic wave; and a detection means in communication with said hydrophone for detecting parameters of said reradiated acoustic wave received by said hydrophone.

2. An apparatus as in claim 1 wherein said reradiated acoustic waves are produced by said non-linear acoustic reradiator as harmonics of said at least one frequency acoustic beam.

3. An apparatus as in claim 2 wherein said non-linear reradiator is cavitation caused by said vessel.

4. An apparatus as in claim 1 wherein said reradiated acoustic waves are produced by said non-linear acoustic reradiator as an intermodulation product of more than one frequency of said at least one frequency acoustic beam.

5. An apparatus as in claim 4 wherein said non-linear reradiator is cavitation caused by said vessel.

6. An apparatus for determining parameters in an aqueous environment comprising:

an acoustic projector positioned in said aqueous environment for projecting an acoustic beam having at least one preset frequency;

a non-linear acoustic reradiator positioned in said aqueous environment to receive said acoustic beam and reradiate an acoustic wave having a different frequency than said preset frequency said non-linear acoustic reradiator comprising a transducer positioned in communication with said aqueous environment, a series resonant circuit electrically connected to said transducer, and a non-linear element electrically connected in series with said series resonant circuit and said hydrophone;

a hydrophone positioned in said aqueous environment to receive said reradiated acoustic wave; and detection means in communication with said hydrophone for detecting parameters of said reradiated acoustic wave received by said hydrophone.

7. An apparatus as in claim 6 wherein said non-linear element is a diode.

8. An apparatus as in claim 7 wherein said series resonant circuit comprises:

an inductor; and a capacitor electrically connected in series with said inductor.

9. An apparatus as in claim 8 wherein said reradiated acoustic waves are produced by said non-linear acoustic reradiator as harmonics of said at least one frequency acoustic beam.

10. Am apparatus as in claim 8 wherein said reradiated acoustic waves are produced by said non-linear acoustic reradiator as an intermodulation product of more than one frequency of said at least one frequency acoustic beam.

11. A method for calibrating a hydrophone in a aqueous environment comprising the steps of:

providing a non-linear acoustic reradiator having known reradiation characteristics;

directing an acoustic beam having a preset frequency towards said provided non-linear acoustic reradiator;

receiving said directed acoustic beam at said provided non linear acoustic reradiator;

changing the preset frequency of said acoustic beam at said provided non-linear acoustic reradiator to a different frequency, said different frequency and amplitude values being known;

reradiating different frequency acoustic waves from said provided non-linear acoustic reradiator;

receiving said reradiated acoustic waves at a hydrophone;

detecting the frequency and amplitude of said reradiated acoustic waves;

comparing the frequency and amplitude of said received reradiated acoustic waves with known frequency and amplitude values for said different frequency acoustic waves reradiated from said provided non-linear acoustic reradiator; and determining hydrophone characteristics based upon said step of comparing.

\* \* \* \* \*